(12) United States Patent
Grebenev

(10) Patent No.: US 7,130,786 B2
(45) Date of Patent: Oct. 31, 2006

(54) USING KERNEL LEVEL SIMULATION TECHNIQUES TO IMPROVE APPLICATION PROGRAM ROBUSTNESS

(75) Inventor: Dmitry Grebenev, E. Setauket, NY (US)

(73) Assignee: Computer Associates Think, Inc., Islandia, NY (US)

( * ) Notice: Subject to any disclaimer, the term of this patent is extended or adjusted under 35 U.S.C. 154(b) by 261 days.

(21) Appl. No.: 10/777,837

(22) Filed: Feb. 12, 2004

(65) Prior Publication Data

US 2005/0197815 A1 Sep. 8, 2005

(51) Int. Cl.
*G06F 9/455* (2006.01)
*G06F 15/00* (2006.01)

(52) U.S. Cl. .............. 703/22; 703/26; 703/28; 714/25; 714/48; 717/121

(58) Field of Classification Search ............... 703/21, 703/23, 22, 26, 28; 717/107, 121, 172; 714/24, 714/25, 48
See application file for complete search history.

(56) References Cited

U.S. PATENT DOCUMENTS 5,784,549 A * 7/1998 Reynolds et al. .......... 714/24
6,075,939 A * 6/2000 Bunnell et al. ............ 717/107
6,393,605 B1 * 5/2002 Loomans ................. 717/121
6,948,165 B1 * 9/2005 Luu et al. ................ 717/172
2003/0093258 A1 * 5/2003 Fishstein et al. ........... 703/21

OTHER PUBLICATIONS

Ambriola, Vincenzo, et al., *The Evolution of Configuration Management and Version Control*; Software Engineering Journal; XP-000294534; pp. 303-310, Nov. 1990.
Thompson, S.M., *Configuration Management—Keeping it all Together*; XP-000722017; BT Technol J vol. 15, No. 3; 13 pages, Jul. 1997.
Stallman, Richard M., et al., *GNU Make*; XP-002354639; 161 pages, Apr. 2000.
PCT International Search Report for Application No. PCT/US2005/017466; 13 pages, Dec. 23, 2005.

* cited by examiner

*Primary Examiner*—Thai Phan
(74) *Attorney, Agent, or Firm*—Baker Botts L.L.P.

(57) ABSTRACT

A method and system for simulating system conditions at a kernel-level is provided. In one aspect, process identifiers of processes for which simulation is to be performed are transmitted along with simulation pattern or rules from a user-space to a kernel space. Emulator in the kernel space intercepts system calls invoked by processes running in the user space. If the system calls originated from the one or more processes for which emulation was to be performed, return results according to the simulation pattern are generated and returned to the calling process.

20 Claims, 3 Drawing Sheets

USING KERNEL LEVEL SIMULATION TECHNIQUES TO IMPROVE APPLICATION PROGRAM ROBUSTNESS

TECHNICAL FIELD

This application relates to computer systems, and more particularly, to using kernel-level techniques to simulate various abnormal conditions during development testing to improve application robustness.

BACKGROUND

During black-box software testing, a wide range of scenarios is not evaluated due to the difficulties of simulating the system conditions that provide those scenarios. For instance, creating abnormal or high-load system conditions such as the unreliable network, memory pressure, or lack of disk space conditions in a real working computer system may negatively impact all other projects that happen to use the same system. Creating such conditions on a real working computer system may also cause damages to the real system, entailing additional costs in the system management and administration. Accordingly, it would be desirable to be able to simulate abnormal system conditions so that software modules may be tested more thoroughly against a wide range of abnormal system conditions, yet other software or projects running on the same system may continue to be run under the normal system conditions.

SUMMARY

A method of simulating testing conditions at a kernel-level is provided. The method in one aspect includes intercepting an operating system call from an application at a kernel-level. In the kernel-level, a determination is made as to whether the operating system call was invoked from a process that was identified for failure emulation. If the operating system call was invoked from a process that was identified for failure emulation, user loaded rules are consulted and results to the operating system call according to the user loaded rules are generated and returned to the calling application. If the operating system call was not invoked from a process that was identified for failure emulation, a native operating system service routine associated with the operating system call is called and normal processing takes place.

The system for simulating testing conditions at a kernel-level in one aspect includes a user-space module operable to transmit one or more process identifiers and one or more rules associated with the process identifiers for emulating failure conditions at a kernel-level and a kernel-level module operable to intercept system call, and further operable to determine whether the system call was invoked from one or more processes identified by the one or more process identifiers and if the system call was invoked from the one or more processes identified by the one or more process identifiers, the kernel-level module further operable to generate a return result according to the one or more rules, and if the system call was not invoked from the one or more processes identified by the one or more process identifiers, the kernel-level module further operable to call native operating system service routine associated with the system call.

In one embodiment, the intercepting of the system calls by the emulator module at the kernel level is transparent to the processes that invoke the system calls.

Further features as well as the structure and operation of various embodiments are described in detail below with reference to the accompanying drawings. In the drawings, like reference numbers indicate identical or functionally similar elements.

DETAILED DESCRIPTION

Figure 1:
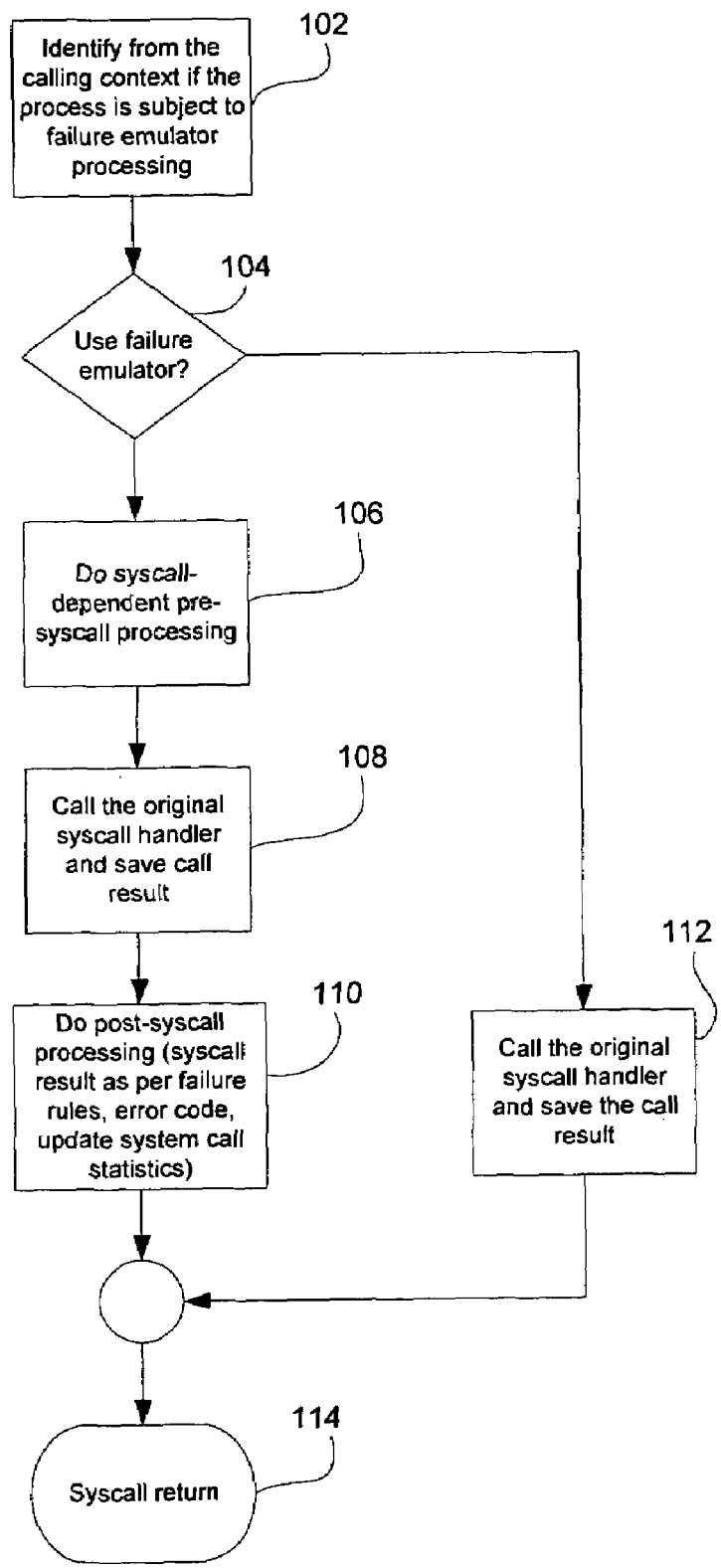
FIG. 1 illustrates the logic of processing in the failure emulator kernel module in one embodiment.

In one embodiment, a kernel-level module simulates test environments on a selective basis, for example, on a per process basis. FIG. 1 illustrates the logic of processing in the failure emulator kernel module in one embodiment. At 102, when a process is called, it is determined whether the process is subject to failure emulator processing. This may be done, for example, by checking the identity of the called process, and whether the process's identity was previously downloaded from the user-space and identified as being the process for failure emulation.

At 104, if a failure emulator is to be used, for example, the process is identified as a process for failure emulation as determined at 102, syscall-dependent pre-syscall processing is performed at 106. Pre-syscall processing may include maintaining any statistics that the failure emulator may choose to provide and any emulator-specific logic such as checking a counter for emulating intermittent failures, for example, a failure in 50 percent of calls can be approximated by condition (count % 2)==0. There are various design approaches which will depend on the particular system call, for example, a short read may be emulated by truncating the size of a read request before the call to the original syscall handler (that is, as part of pre-syscall processing) or by just returning part of the buffer of a full read. In some cases, it may not be necessary to call the original syscall handler at all.

At 108, the original syscall handler is called and the results from the call is saved. At 110, post-syscall processing is performed. Examples of post-syscall processing include generating syscall result as provided by failure rules, generating error codes as provided by failure rules, and updating system call statistics. Maintaining system call statistics may help setting up and conducting tests.

At 104, if failure emulator is not being used, at 112 the original syscall handler is called and the call results are saved. At 114, syscall returns to its caller with appropriate results and/or error codes.

In one embodiment, the kernel module uses kernel-intercept technology where system calls are intercepted. The result of a particular system call executed by an application under testing depends on a set of rules downloaded to the kernel module using a user-level binary, for example, a user-space set up utility module.

The user-level binary provides control over what is simulated and how, for instance, intermittent short reads, occasional failure of memory allocations. Intermittent and occasional failures can be emulated by maintaining a set of counters for each system call and using a type of pseudo random number generator. The user level binary is used to communicate selected failure types and patterns to the kernel module that simulates them.

In one embodiment, failure characterization are system call-based, for example, "make 50 percent of read calls from a process with pid 1211 fail pseudo-randomly with a short read error". Each failure can be described by the system call, percentage of times it should fail and exact type of failure possible for the system call in question. Process identifiers of the target processes (for example, process owner, group owner, pid) can be downloaded to the failure emulator kernel module by a separate API call. The failure patterns (rules) may be selected by the user based on his scope of interest and what is available or implemented in the failure emulator kernel module.

The simulation may be done without requiring any modifications of the applications being tested. Thus, it is possible to test the exact application binary before the application is released to customers.

Figure 2:
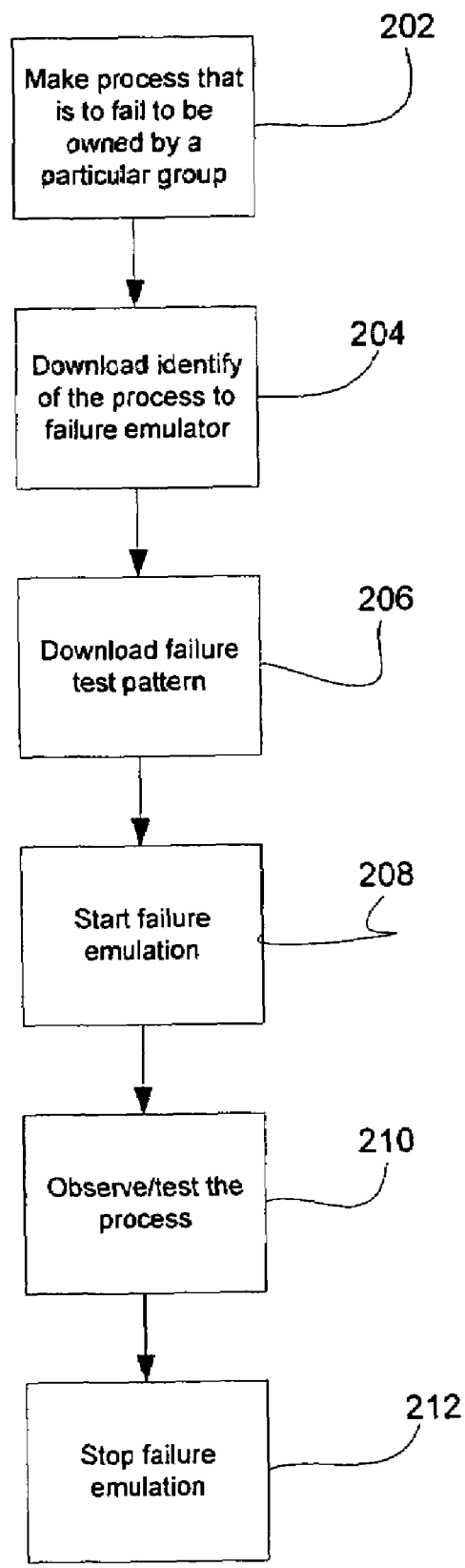
FIG. 2 is a flow diagram illustrating method for activating failure simulation in one embodiment.

In one embodiment, a testing person may activate failure simulation for a particular process or group of processes by issuing a command that provides process identification to the kernel module together with a chosen set of failures and their patterns. FIG. 2 is a flow diagram illustrating a method for activating failure simulation in one embodiment. At 202, the group attribute of the process, for which the failure condition is to be emulated, is set to one particular group. This way, one particular group may have the group ownership of the executable file that spawns the process. For example, for
a file called netdaemon:
 groupadd failtest
 chgrp failtest netdaemon
make the file netdaemon owned by failtest.

At 204, the identities of the processes that are to fail are downloaded to the failure emulator module. For example, the command line: fem_control-i -g failtest will download the identities to the failure emulator module called fem_control. At 206, failure test patterns are downloaded as follows: fem_control-c 3 -t 1, where -c 3 requests call # 3 (read), -t 1 requests read failure of type 1. Failure type 1 may, for example, be short reads. At 208 failure emulation is started, for example, by the following command: fem_control -a 1. Here, the parameter "-a 1" sets active flag on, enabling the kernel-level emulation module.

At 210, the returned test failure patterns may be observed, for example, to check how the process responds to the failure. For example, once simulation is activated, a tester may observe program behavior correlating observations with requested type of failure. At 212, the failure emulation may be stopped, for example, by a command: fem_control -a 0.

Figure 3:
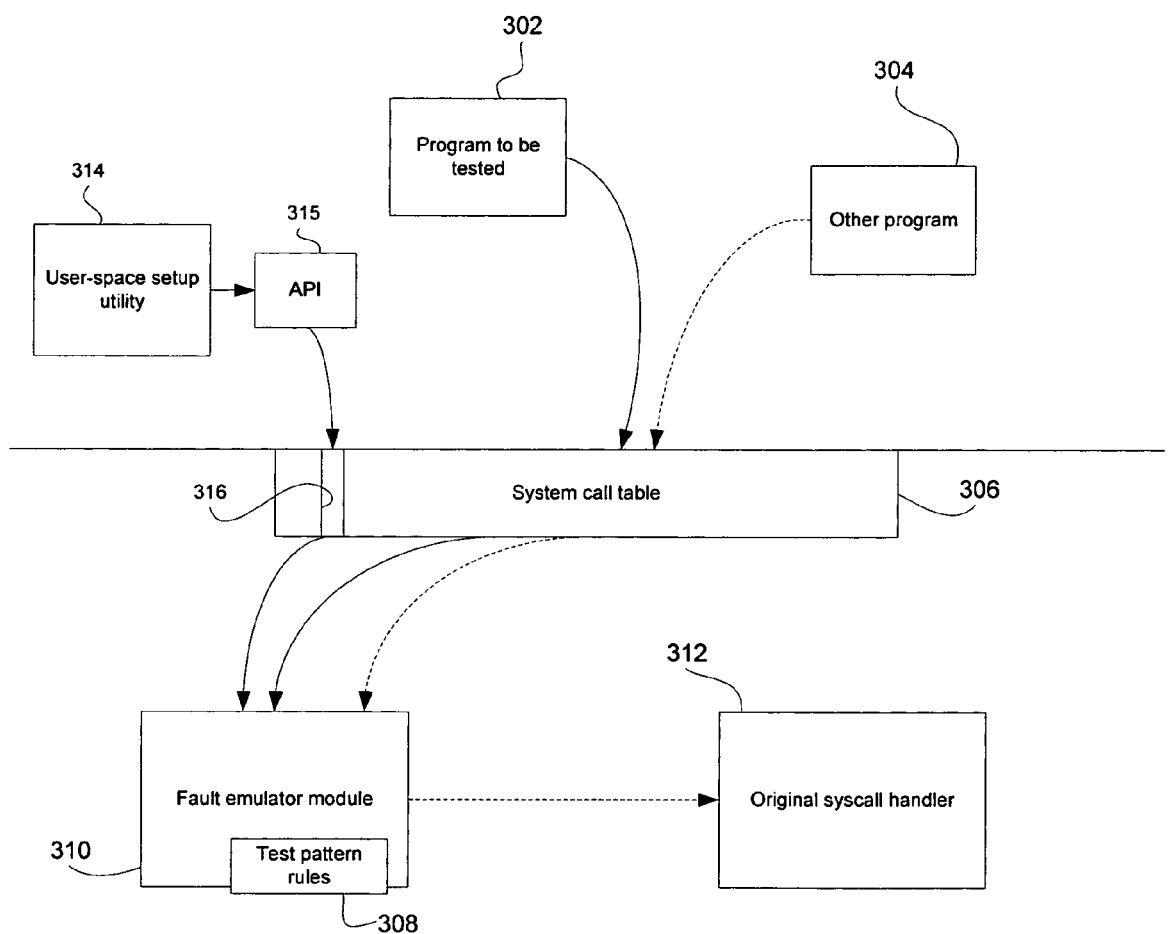
FIG. 3 is a block diagram illustrating the kernel-level components and user-space setup utility components in one embodiment.

In one embodiment, the kernel-level simulation system disclosed in the present application includes kernel-level components and user-space setup utility components. FIG. 3 is a block diagram illustrating the kernel-level components and user-space setup utility components in one embodiment. The kernel-level components may be a library statically linked into the kernel during the kernel build. The kernel-level components may also be dynamically loaded as a module.

In the following discussion, both types are referred to as a failure emulator kernel module. The arrows in FIG. 3 illustrate control/data paths when failure emulator is active. In one embodiment, all service calls from user programs 302 304 go through the system call dispatch 306 to the failure emulator kernel module 310 which then calls the original system call handler 312. In one embodiment, the failure emulator module is completely transparent. The test pattern rules 308 are consulted for each process to be tested to see what kind of failure is requested.

The user-space setup utility components communicate setup data to the kernel-level components. User-space setup utility 314 in one embodiment is a program that is used to set up and control the kernel emulation module 310. It communicates with the kernel emulation module 310 via its own system call that is installed during the kernel module startup in a spare system call table slot 316. In one embodiment, the failure emulator API 315 is based around that system call. The user-space setup utility 314 parses the command line, sets up the parameters for and makes an API call 315. The API call 315 communicates with the kernel emulation module 310 using the system call 316.

In one aspect, operating service calls from the user-level 302, 304 are intercepted at the system call table level 306, by replacing the addresses of original system call handlers with addresses of functions in the failure emulator kernel module 310, then modifies their behavior for the calling processes, consulting the rules 308 uploaded by the user-space control utility.

A typical system call wrapper in the failure emulator kernel module has code similar to the following for a read system call:

```
if (caller is a target_process) {
    if (rules[__NR_read].enabled) {
        rc = (*orig_read_sycall) (arg1, arg2, arg3) ;
        switch (rules[[__NR_read].type) {
            case SHORT_READ:
                rc >>= 1 ;
                SET_ERRNO(0) ;
                break ;
            case INTRD_READ:
                rc = -1 ;
                SET_ERRNO(EINTR) ;
                break ;
            default:
                rc = -1 ;
                SET_ERRNO(EINTR) ;
                break ;
        }
        return rc ;
    } else {
        return (*orig_read_sycall) (arg1, arg2, arg3) ;
    }
} else {
    return (*orig_read_sycall) (arg1, arg2, arg3) ;
}
```

For all other processes running on the same system, native operating system service routines are processed normally as shown in the above example.

The system and method of the present disclosure may be implemented and run on a general-purpose computer. The embodiments described above are illustrative examples and it should not be construed that the present invention is limited to these particular embodiments. Although the description was provided using the UNIX system call table as an example, it should be understood that the method and system disclosed in the present application may apply to other operating systems. Thus, various changes and modifications may be effected by one skilled in the art without departing from the spirit or scope of the invention as defined in the appended claims.

I claim:

1. A method of simulating system conditions at a kernel-level, comprising:

intercepting an operating system call from a software application at a kernel-level;

determining that a first operating system call was called from a process that was identified for failure emulation for the testing of the software application;

consulting user loaded rules and returning results to the first operating system call according to the user loaded rules to result in the testing of the software application; and calling a native operating system service routine associated with a second operating system call, the testing of the software application in response to the first operating system call not effecting the calling of the native operating system service routine associated with the second operating system call.

2. The method of claim 1, wherein the determining includes at least determining whether an identifier of the process was communicated previously as being a process for failure emulation.

3. The method of claim 1, wherein the user loaded rules include at least one rule directed to the group consisting of type of failure to emulate, frequency of failure, and error codes to return.

4. The method of claim 1, wherein the intercepting is transparent to the process for failure emulation.

5. The method of claim 1, wherein intercepting the operating system call comprises replacing an address of operating system call with an address of a process associated with the user loaded rules.

6. A method of simulating system conditions at a kernel-level, comprising:

identifying one or more processes to a kernel-level module for which to emulate failures for the testing of one or more software applications;

transmitting one or more failure rules to the kernel-level module, the one or more failure rules associated with the one or more processes;

activating the kernel-level module; and running the one or more processes to result in the testing of the one or more software applications, the running of the one or more processes not effecting the overlapping performance of one or more native operating system service routines.

7. The method of claim 6, wherein the identifying includes at least transmitting one or more process identifiers to the kernel-level module, the one or more process identifiers associated with respective one or more processes for which failure emulation is to be performed.

8. The method of claim 6, further including deactivating the kernel-level module.

9. The method of claim 6, wherein the one or more failure rules include at least one rule directed to the group consisting of type of failure to emulate, frequency of failure, and error codes to return.

10. The method of claim 6, wherein the running of the one or more processes is transparent to the process for failure emulation.

11. The method of claim 6, wherein running of the one or more processes comprises:

intercepting an operating system call from the one or more software application at a kernel-level; and replacing an address of the operating system call with an address of a process associated with the one or more failure rules.

12. Logic for simulating system conditions at a kernel level, the logic encoded in a storage medium and operable when executed to:

intercept an operating system call from a software application at a kernel-level;

determine that a first operating system call was called from process that was identified for failure emulation for the testing of the software application;

consult user loaded rules and returning results to the first operating system call according to the user loaded rules to result in the testing of the software application; and call a native operating system service routine associated with a second operating system call, the testing of the software application in response to the first operating system call not effecting the calling of the native operating system service routine associated with the second operating system call.

13. The logic of claim 12, wherein the determining includes at least determining whether an identifier of the process was communicated previously as being a process for failure emulation.

14. The logic of claim 12, wherein the user loaded rules include at least one rule directed to the group consisting of type of failure to emulate, frequency of failure, and error codes to return.

15. The logic of claim 12, wherein the intercepting is transparent to the process for failure emulation.

16. A system for simulating system conditions at a kernel-level, comprising:

a user-space module operable to transmit one or more process identifiers and one or more rules associated with the process identifiers for emulating failure conditions for the testing of a software application at a kernel-level; and a kernel-level module operable to:

intercept an operating system call from the software application, determine that a first operating system call was invoked from one or more processes identified by the one or more process identifiers, consult the one or more rules associated with the process identifiers and generate a return result according to the one or more rules to result in the testing of the software application, and call a native operating system service routine associated with a second operating system call, the testing of the software application in response to the first operating system call not effecting the calling of the native operating system service routine associated with the second operating system call.

17. The system of claim 16, wherein the user-space module further includes an application programming interface that communicates with the kernel-level module.

18. The system of claim 16, wherein the one or more rules include at least one rule directed to the group consisting of type of failure to emulate, frequency of failure, and error codes to return.

19. The system of claim 16, wherein the intercepting of the operating system call is transparent to the process for failure emulation.

20. The system of claim 16, wherein intercepting the operating system call from the one or more software application at a kernel-level comprises replacing an address of the operating system call with an address of a process associated with the one or more rules.

* * * * *